United States Patent [19]

Kremers et al.

[11] 4,410,787

[45] Oct. 18, 1983

[54] IMAGE ACQUISITION APPARATUS AND PROCESS

[75] Inventors: Jan H. Kremers, Boulder Creek; Alfred E. Brain, Santa Cruz, both of Calif.

[73] Assignee: SRI International, Menlo Park, Calif.

[21] Appl. No.: 297,911

[22] Filed: Aug. 31, 1981

[51] Int. Cl.³ .............................................. B23K 9/10
[52] U.S. Cl. ................................ 219/124.34; 358/107
[58] Field of Search ....................... 219/124.34, 124.22, 219/130.01, 124.02, 130.21, 130.31; 358/107, 139; 356/376

[56] References Cited

U.S. PATENT DOCUMENTS 4,240,110 12/1980 Henry ................................. 358/107

FOREIGN PATENT DOCUMENTS 2950657 6/1981 Fed. Rep. of Germany ........................ 219/130.31
650749 3/1979 U.S.S.R. .......................... 219/124.34

Primary Examiner—C. C. Shaw
Attorney, Agent, or Firm—Edward B. Gregg; Willis E. Higgins

[57] ABSTRACT

As apparatus for sensing reflected light patterns in the presence of a welding arc has an image-sensing means. Means is provided for directing one or more pulses of light of short duration at a workpiece. Each pulse has a peak intensity greater than that of the welding arc. A means is provided for blocking the light image from the sensing means except during a pulse from the light-directing means. An image sensing process includes the steps of directing light at the workpiece in one or more pulses, each of greater intensity than the welding arc. Light from the pulse reflected from the workpiece is sensed during the pulse, and sensing of light from the welding arc is blocked during the absence of a light pulse. This apparatus and process allows improved sensing of the light patterns in the presence of the welding arc and welding sparks.

6 Claims, 3 Drawing Figures

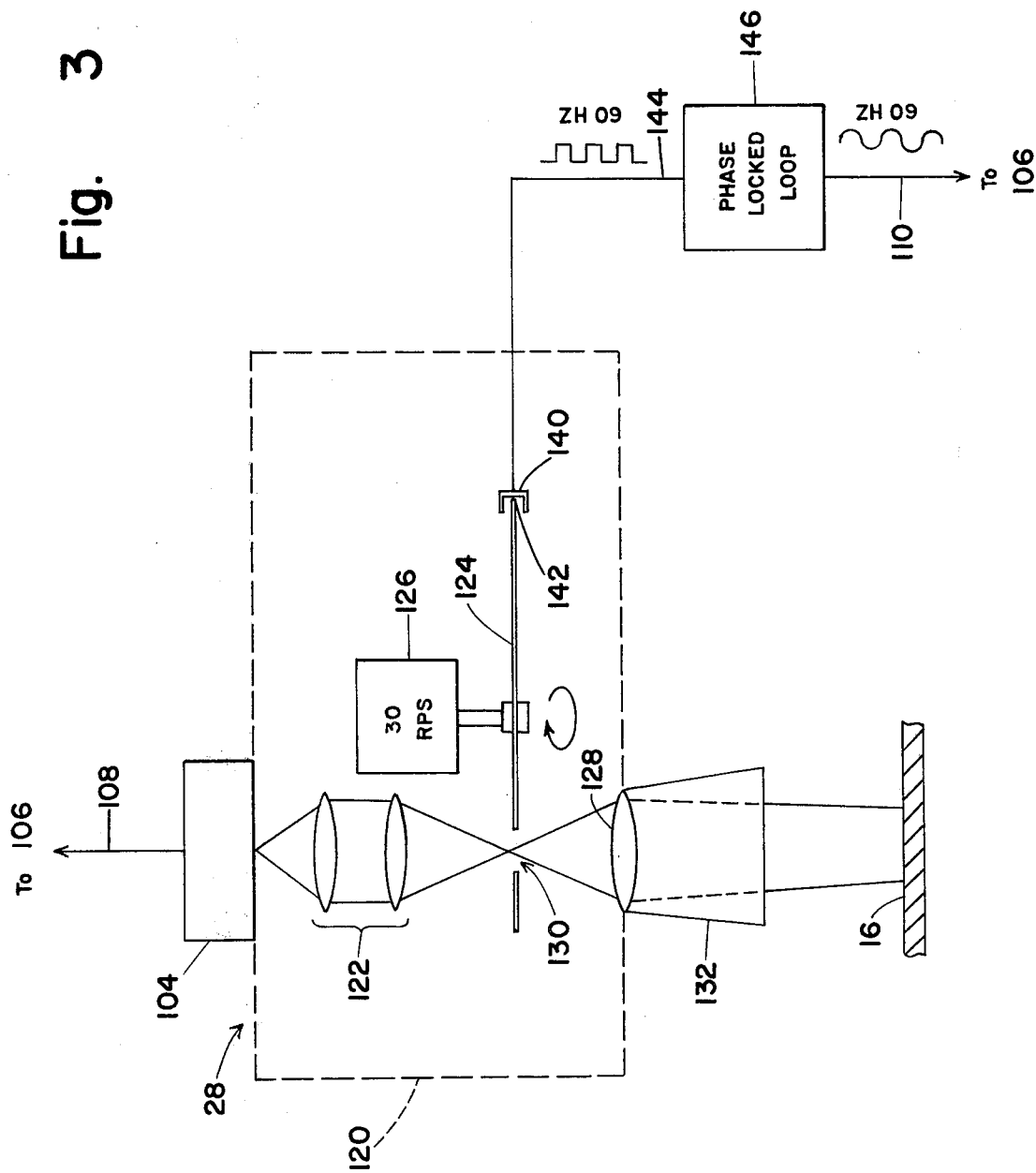

IMAGE ACQUISITION APPARATUS AND PROCESS

CROSS-REFERENCE TO RELATED APPLICATION

This application and a concurrently filed, copending application by Jan H. Kremers and Robert C. Bolles, entitled "Implement Positioning Apparatus and Process", contain claims to related inventions.

BACKGROUND OF THE INVENTION

1. Field of the Invention

This invention relates to an apparatus and process for sensing reflected light patterns for a workpiece in the presence of a welding arc. More particularly, it relates to such an apparatus and process which will discriminate between a reflected light pattern from a workpiece and reflected light from a welding arc. The reflected light patterns are utilized to characterize the workpiece geometry for the purpose of controlling the positioning of the workpiece with respect to a welding head.

2. Description of the Prior Art

Welding head positioning systems are known in the art, in which reflected light projected on the workpiece is sensed in the presence of other reflected light from a welding arc, for the purpose of controlling positioning of the welding head and the workpiece relative to one another. For example T. Nozaki et al, Robot "'Sees', Decides and Acts", Welding and Metals Fabrication, Vol. 47, No. 9, pp. 647-658 (November, 1979), discloses such a system in which an infrared transmissive filter is used to screen out frequencies of the reflected light at which the reflected projected light and the reflected welding arc light have a similar intensity. While that approach is feasible in the case of a simple spot of light projected on the workpiece, a more complex pattern of light projected on a workpiece requires a better ability to discriminate between projected light and welding arc light. Also, the system does not discriminate against welding sparks, which tend to emit a broad band of light frequencies, including those in which the light source and sensitivity of the camera coincide.

SUMMARY OF THE INVENTION

Accordingly, it is an object of this invention to provide an apparatus and process for improved sensing of light patterns reflected from a workpiece in the presence of a welding arc.

It is another object of the invention to provide an apparatus and process for improved discrimination between a reflected light image projected on a workpiece and light reflected from a welding arc.

The attainment of these and related objects may be achieved through use of the novel image-sensing apparatus and process herein disclosed. The apparatus of this invention includes an image-sensing means. A means is provided for directing light in a predetermined pattern at the workpiece in one or more pulses of short duration, i.e., having a duration less than a frame time of a camera employed in the apparatus of this invention. Each pulse has a peak intensity substantially greater than the intensity of the welding arc. A means is provided for blocking the light image from the sensing means except during a pulse from the light-directing means. In a preferred embodiment, a stored image array in a television camera is used as the sensing means, and an image stored during a pulse of light in one scanning frame of the television camera is read at the beginning of the next frame, while the light image from the workpiece is blocked from the sensing means. If more than one pulse of light is used in rapid succession, it is easy to eliminate welding sparks, since the successive images will contain a different pattern of sparks. Even with only one pulse of short duration, the sparks are reduced to points of light, however.

In the process of this invention, light is directed at the workpiece in one or more pulses, each having an intensity greater than the welding arc. The light from the pulse reflected by the workpiece is sensed during the pulse, and sensing of light from the welding arc is blocked during the absence of a pulse of light directed at the workpiece.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 3 is a diagram partially in schematic form and partially in cross-section form, of an apparatus in accordance with the invention.

DETAILED DESCRIPTION OF THE INVENTION

Figure 1:
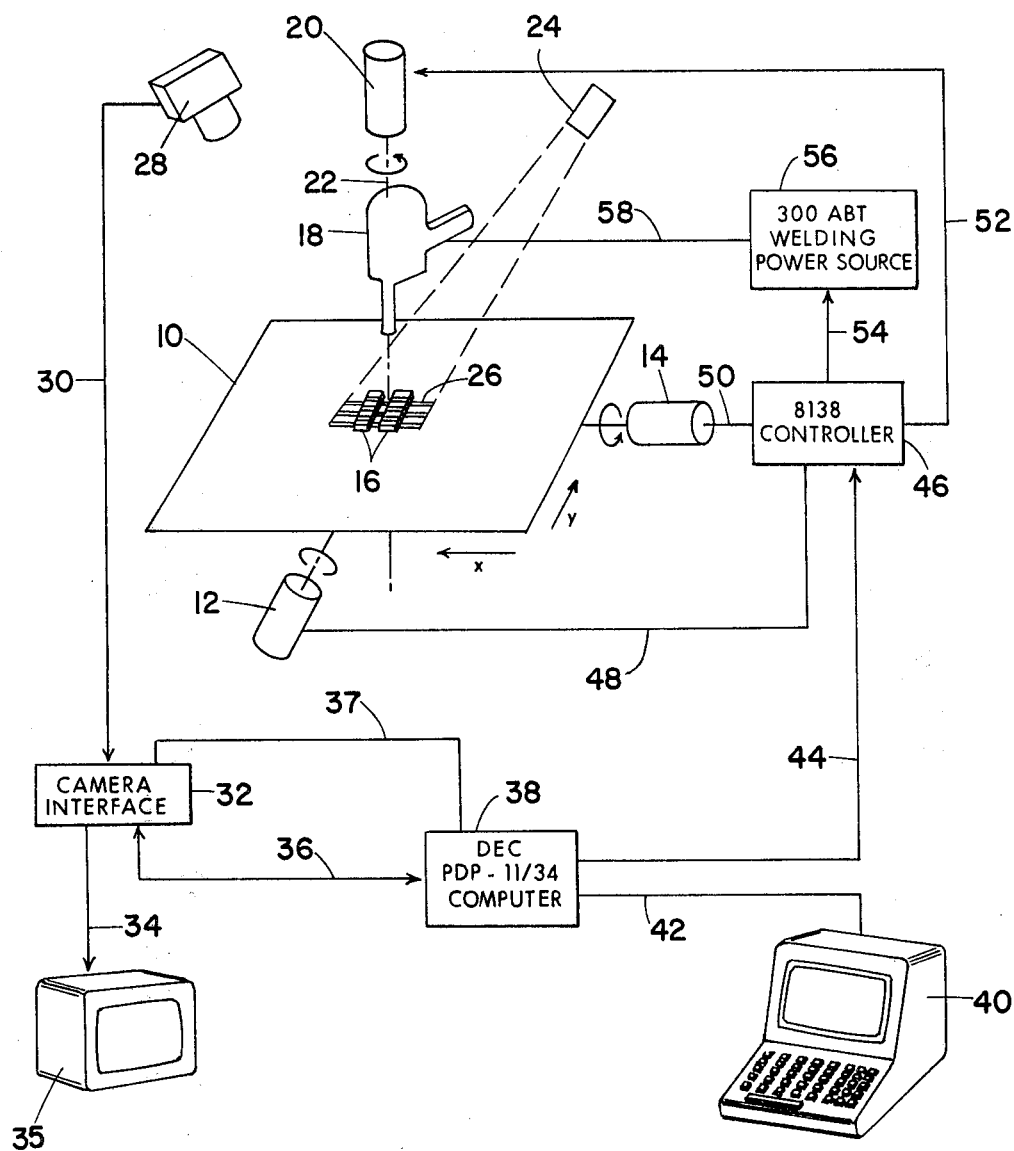
FIG. 1 is a diagram partially in schematic form and partially in perspective form of an automatic welding apparatus in which the invention is employed.

Turning now to the drawings, more particularly to FIG. 1, there is shown an automatic welding apparatus in which the present invention is used. A more complete description of the construction and operation of the welding apparatus shown in FIG. 1 is contained in the above-referenced Kremers and Bolles application, the disclosure of which is incorporated by reference herein. However, the following discussion of FIG. 1 is given here as a convenience, for providing a background for more complete understanding of the present invention.

The apparatus includes an x-y table 10 driven by stepping motors 12 and 14. A workpiece 16 to be welded is positioned on the x-y table 10. A welding gun 18 of known type incorporating a welding wire feeder is mounted above the x-y table 10. In this embodiment, the workpiece 16 is thus moved to position it beneath the stationary welding gun 18. Of course, it is also possible to have the workpiece 16 remain stationary and move the welding gun 18 along the workpiece 16 to make a weld. A third stepping motor 20 is connected to the welding gun 18 for pivoting the welding gun 18 about z axis 22. In practice, a manually operable rotary state (not shown) is also provided to adjust the angle that welding gun 18 makes with respect to the plane of x-y table 10.

A light source 24 is positioned above the x-y table 10 to illuminate the workpiece 16 to be welded with a light pattern 26. Further details on the nature of light pattern 26 are presented below in connection with the discussion of FIG. 2 and in the above-referenced Kremers and Bolles application. Although the light source 24 can be implemented with any source that will project a pattern 26 having the characteristics discussed below on the workpiece 16, it is preferred to implement the light source 24 as an electronically controlled xenon flasher including a small, mechanically rugged projector head which receives a slide containing a suitable image for generation of the pattern 26.

A television camera 28 is positioned remote from the light source 24 to receive the light pattern 26, as reflected from the workpiece 16. It is important that the camera 28 be positioned remote from the light source 24 to give a different angle with respect to the workpiece 16, because the apparatus utilizes triangulation to determine three dimensional characteristics of workpiece 16 from a two dimensional image. Although essentially any television camera is appropriate, in a preferred embodiment, a General Electric model TN 2500 CID solid state television camera is employed. Output 30 of the camera 28 is connected to camera interface circuits 32, which supply either a raw grey scale or a thresholded binary image on output 34 to a conventional television monitor 35, depending on a control input to the interface circuits 32 on line 37 from computer 38. The camera interface circuits 32 also have an output 36 as a direct memory access (DMA) input to computer 38.

Computer 38 may be essentially any commercially available minicomputer, implemented in the preferred embodiment with a PDP-11/34 minicomputer, available from Digital Equipment Corporation, Maynard, Mass. User access to the computer 38 is provided by means of a display terminal 40, such as a Tektronix 4006 display terminal obtainable from Tektronix, Inc., Beaverton, Oreg. The display terminal 40 is connected to computer 38 by line 42. Computer 38 carries out analysis of data supplied by the camera interface circuits 32 on line 36. Terminal 40 is used to display results of operations carried out on image data supplied to computer 38 on line 36 and allow user access to computer 38.

Outputs from the computer 38, based on the data analysis, are supplied on line 44 to controller 46. Line 44 is desirably implemented as a 1200-Baud, RS 232 type serial line. Controller 46 is connected to the stepping motors 12, 14 and 20 by lines 48, 50 and 52, respectively, to control positioning of the x-y table 10 and the welding gun 18. The controller 46, in a preferred embodiment, is implemented by a Summit Engineering model 8138 controller. Line 54 further connects the controller 46 to a welding power source 56, such as a Miller Electric Model 330 ABT constant current welding power source, which is connected to the welding gun 18 by line 58.

The system shown in FIG. 1 provides control signals to direct the motion of welding gun 18. These control signals are created by a computer program in computer 38, which program analyzes the electrical image supplied by television camera 28. Television camera 28 looks at the area of workpiece 16 containing the joint between the parts being welded. Further details on the image analysis program are provided by the above-referenced Kremers and Bolles patent application.

Figure 2:
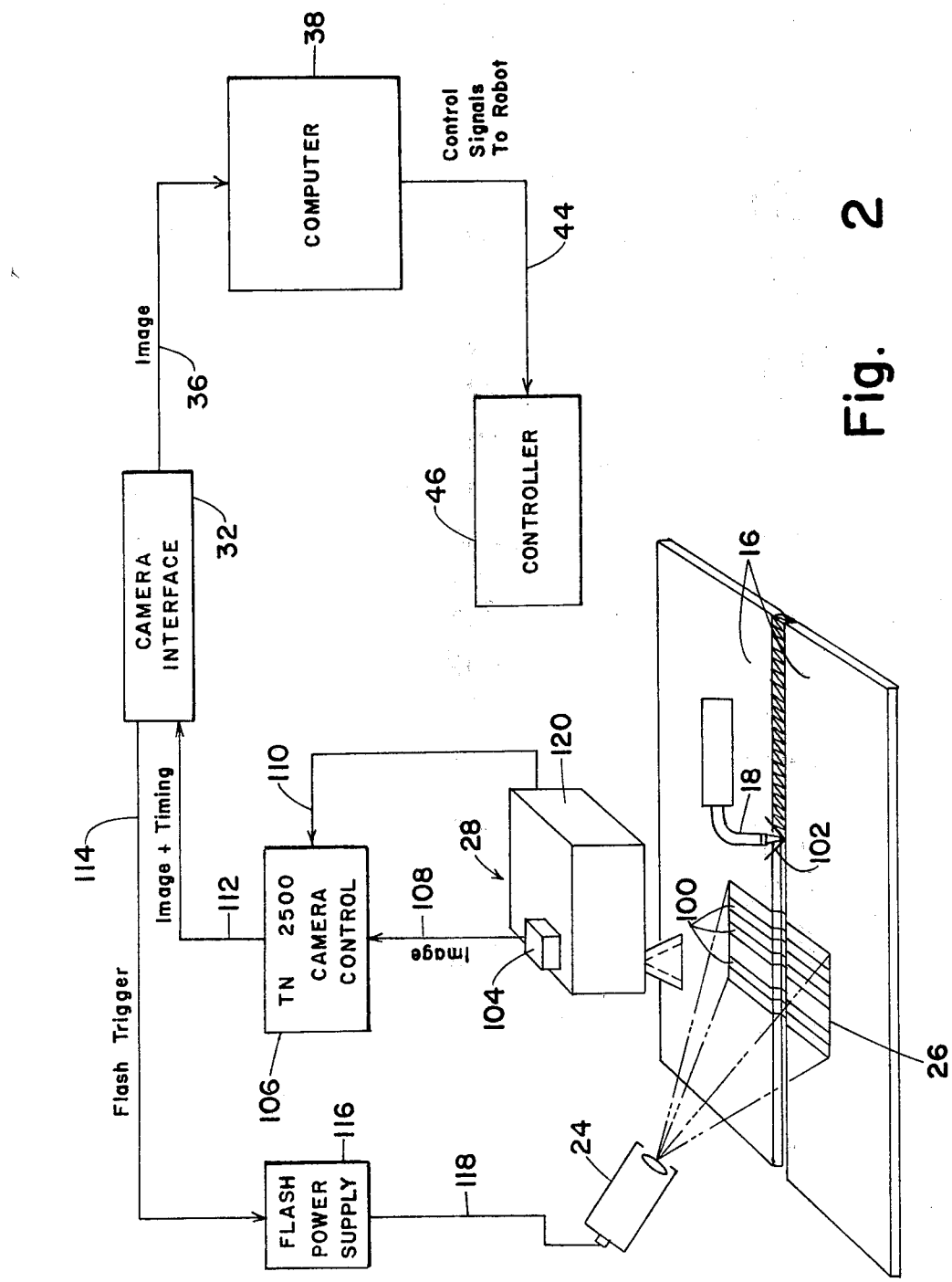
FIG. 2 is a diagram, also partially in schematic form and partially perspective form, of portions of the welding apparatus shown in FIG. 1, and showing apparatus in accordance with the invention.

An embodiment of apparatus in accordance with the invention for acquiring the television image to be analyzed in the system of FIG. 1 is shown in FIG. 2. As in FIG. 1, the light source 24 projects a pattern 26 of known configuration on the workpiece 16. Light source 24 is shown in FIG. 2 as a xenon electronically controlled flash unit. As shown, the pattern 26 may comprise a plurality of parallel light bars 100, with two of the light bars 100 having a different spacing between them and constituting reference light bars. Television camera 28 is focused on the portion of workpiece 16 illuminated by the light pattern 26, and the television camera 28 receives reflected light from the pattern 26. Camera 28 also receives reflected light from welding arc 102, produced by welding gun 18, but the camera 28 is positioned sufficiently ahead of the welding arc 102, so that it does not receive light directly from the arc. Camera 28 is implemented as a General Electric model TN 2500 camera with resolution of 241 by 241 picture elements in stored image photocells, indicated at 104. The photocell array 104 is connected to camera control circuits 106 by line 108. The camera control circuit 106 also receives a timing signal input on line 110 from a chopper, to be discussed below in connection with FIG. 3. Camera control circuit 106 supplies image and timing signals on line 112 to camera interface circuit 32. The camera interface circuit 32 supplies image signals on line 36 to computer 38. The camera interface circuit 32 also supplies timing signals on line 114 to power supply 116, which supplies output pulses on line 118 to energize light source 24. Computer 38 supplies control signals on line 44 to activate controller 46 for positioning workpiece 16 relative to the welding gun 18, camera 28 and light source 24 (see also FIG. 1).

FIG. 3 shows how the commercially available General Electric TN 2500 television camera 28 has been modified to operate in accordance with this invention. In place of the usual camera lens provided with the General Electric TN 2500 camera 28, a light-tight box 120 is provided, containing a set of relay lenses 122 to focus images on photocell array 104. A chopper wheel 124 is mounted below relay lens system 122 and is driven by a 30 revolution per second (RPS) chopper motor 126. Lens 128 of the type usually provided with the General Electric TN 2500 camera is positioned below chopper wheel 124 to direct images from workpiece 16 through aperture 130 in the chopper wheel 124, as the aperture 130 rotates into position between lens 128 and relay lens system 122. A shade 132 is provided for lens 128 to minimize the amount of scattered arc light directly entering the camera lens 128, and also allow the camera to be focused closer to the welding arc without receiving arc light directly. Aperture 130 is typically in position to provide an image to photocell array 104 for about 1 millisecond for each rotation of chopper wheel 124.

In order to produce the timing signals for operation of the camera 28 and the electronic flash 24, a light-emitting diode (LED)-photodiode pickoff 140 of a conventional type is positioned at edge 142 of the chopper wheel 124. The pickoff 140 is connected by line 144 to a phase-locked loop circuit 146, which receives a 60 Hertz square wave signal from pickoff 140 as a result of rotation of the chopper wheel 124. The phase-locked loop 146 converts the nominal 60 Hertz square wave to a novel 60 Hertz sine wave, which is supplied on line 110 to camera control circuit 106 (see also FIG. 2).

In operation, the relay lens system 122 focuses the image provided by the camera lens 128 onto the photocell array 104 in the camera 28. The primary image produced by the camera lens 128 is substantially in the same plane as the chopper wheel 124. The chopper wheel 124 acts as a shutter that prevents light from reaching the photocell array 104, except for a brief period when the electronic flash 24 (FIGS. 1 and 2) is in operation. The light from electronic flash 24 is substantially brighter than the welding arc 102 for the brief period of 0.5 millisecond that it flashes.

It is preferred that the photocell array 104 be of an image storing type, e.g., the light distribution on the subject that is created by the electronic flash puts a charge distribution on silicon photocells in the array 104 that is retained for a substantial period after the flash is over and the chopper wheel shutter 124 is closed. The closed shutter prevents degradation of the quality of the image stored by the photocell array 104 by reason of stray light from the continuous welding arc 102.

The flash tube 24 is fired during the vertical retrace period at the end of a complete scanning frame of the camera 28. The resulting image is read from the camera 28 by the camera control circuit 106, beginning at the commencement of the next complete frame. The mechanical chopper disc 124 is driven in synchronization with the power line at 30 RPS by the synchronous motor 126. However, since such motors are liable to "hunt", i.e., drift in phase relative to the power line, the photocell pickoff 140 is used to control the phase-locked loop 146, whose output is the 60 Hertz sine wave that is locked in phase with the rotation of the shutter disc 124. This signal is supplied to the camera control circuit 106 in place of the camera's normal line-locked signal to force the internal timing signals of the camera into phase with the rotation of the chopper disc 124. This mode of operation is needed to assure that the flash trigger signal on line 114, which is derived from the vertical retrace signals of the camera, occurs precisely when the aperture 130 in the chopper disc 124 is aligned with the optical axis of the lens system 128 and 122. The electrical image signals developed by discharging capacitors associated with the photocells in the array 104 of the camera 28, are produced while the chopper disc shutter 124 is closed, i.e., the hole in the chopper disc is not aligned with the optical axis. The electrical image signals are therefore not degraded by light emitted from the welding arc.

It should now be apparent to those skilled in the art that an apparatus and process capable of achieving the stated objects of the invention has been provided. The apparatus and process will sense light patterns reflected from a workpiece in the presence of a welding arc with improved discrimination as a result of pulsed operation of a light source for projecting the patterns on the workpiece and the use of a shutter synchronized with the pulsed light patterns. Because the shutter employed in the apparatus is open for only a brief period, welding sparks are reduced to points, rather than lines, and are therefore not a problem.

It should further be apparent to those skilled in the art that various changes in form and detail of the invention as shown and described may be made. For example, in the above description, the shutter disc 124 acts as the master clock for the system. It is not essential that a phase-locked loop be employed in connection with the pickoff 140. The use of the phase-locked loop allows a simple interface to the model TN 2500 camera. A simple timing pulse derived directly from the photocell pickoff 140 could also be used, but would require more extensive modification of the camera. Other forms of shutters, such as a high speed leaf shutter, a birefringent crystal, a vibrating reed, or gated image intensifier could also be used in place of the rotating disc chopper. It is intended that such changes be included within the spirit and scope of the claims appended hereto.

What is claimed is:

1. In an apparatus for controlling positioning of a workpiece relative to a welding head while the welding head produces a welding arc by directing light in a predetermined pattern at the workpiece and sensing the light image from the pattern reflected from the workpiece to obtain information about the workpiece, the combination comprising:
    an image-sensing means positioned to avoid sensing of light directly from the welding arc,
    means for directing the light at the workpiece in at least one pulse having a peak intensity substantially greater than intensity of the welding arc, and
    means for blocking the light image from the sensing means except during a pulse from said light-directing means.

2. The apparatus of claim 1 in which said light-directing means comprises a xenon electronically controlled flash unit.

3. The apparatus of claim 1 in which said light image-blocking means is a shutter synchronized to be open during the pulses of the light.

4. The apparatus of claim 1 in which said sensing means comprises an array of image storing photocells.

5. A process for sensing an image of a workpiece in an automated welding system in the presence of a welding arc, which comprises directing light at the workpiece in at least one pulse having an intensity greater than the welding arc, sensing the light from the pulse reflected by the workpiece during the pulse, blocking the sensing of light from the welding arc during absence of the pulse of light directed at the workpiece, and avoiding sensing light directly from the welding arc.

6. The process of claim 5 in which electrical image signals are generated from the sensed light pulse during the blocking of light sensing from the welding arc.

* * * * *